(12) United States Patent
Cragel et al.

(10) Patent No.: US 9,321,347 B2
(45) Date of Patent: Apr. 26, 2016

(54) COMPLIANCE STRUCTURE FOR A DISTENSIBLE FUEL TANK

(71) Applicant: Ford Global Technologies, LLC, Dearborn, MI (US)

(72) Inventors: Daniel Frank Cragel, Livonia, MI (US); Russell Randall Pearce, Ann Arbor, MI (US); Patrick Sullivan, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 13/887,192

(22) Filed: May 3, 2013

(65) Prior Publication Data

US 2013/0240539 A1 Sep. 19, 2013

Related U.S. Application Data

(63) Continuation-in-part of application No. 13/597,233, filed on Aug. 28, 2012, now Pat. No. 8,657,051, which is a continuation-in-part of application No. 12/815,283, filed on Jun. 14, 2010, now Pat. No. 8,251,171.

(51) Int. Cl.
*B60K 15/03* (2006.01)
*B60K 15/077* (2006.01)

(52) U.S. Cl.
CPC .............. *B60K 15/077* (2013.01); *B60K 15/03* (2013.01); *B60K 2015/0344* (2013.01); *B60K 2015/03171* (2013.01); *B60Y 2200/92* (2013.01)

(58) Field of Classification Search
CPC .......... B60K 15/03; B60K 2015/0344; B60K 2015/03171; B60K 2015/0777; B60K 15/077; B60K 15/0775; B60Y 2200/92; F17C 1/08; B64D 37/06; B64D 37/08; B65D 9/54
USPC ................ 180/69.4; 220/562, 563, 564, 4.12, 220/4.13, 4.14, 639, 646, 651–653, 905; 428/156
See application file for complete search history.

(56) References Cited

U.S. PATENT DOCUMENTS

| 2,082,836 | A | * | 6/1937 | Kjekstad | 114/79 W |
|---|---|---|---|---|---|
| 2,144,945 | A | * | 1/1939 | Sutton | 220/651 |
| 2,160,360 | A | * | 5/1939 | Hassan | 220/565 |
| 2,451,131 | A | | 10/1948 | Vidal et al. | |
| 2,533,431 | A | * | 12/1950 | Chausson | 220/563 |
| 2,860,809 | A | | 11/1958 | Perry | |
| 2,982,441 | A | * | 5/1961 | Farrell et al. | 220/652 |
| 3,112,044 | A | * | 11/1963 | Larsen et al. | 220/565 |
| 3,462,330 | A | * | 8/1969 | Greig et al. | 156/210 |

(Continued)

FOREIGN PATENT DOCUMENTS

DE 2456525 A1 * 12/1976
EP 2174820 A3 * 6/2011

(Continued)

*Primary Examiner* — Paul N Dickson
*Assistant Examiner* — Steve Clemmons
(74) *Attorney, Agent, or Firm* — James Dottavio; Alleman Hall McCoy Russell & Tuttle LLP

(57) ABSTRACT

A distensible fuel tank included in a vehicle is provided. The distensible fuel tank includes a housing and a compliance structure coupled to the housing, the compliance structure including a base element coupled to a side of a structural element.

20 Claims, 16 Drawing Sheets

(56) References Cited

U.S. PATENT DOCUMENTS

| | | | |
|---|---|---|---|
| 3,501,367 A | 3/1970 | Parker | |
| 3,595,422 A * | 7/1971 | Durrett et al. | 220/4.14 |
| 3,596,794 A * | 8/1971 | Peters | 220/646 |
| 4,399,850 A | 8/1983 | Schiemann | |
| 4,886,180 A * | 12/1989 | Bonczyk | 220/646 |
| 4,964,530 A * | 10/1990 | Graaff | 220/626 |
| 4,964,531 A | 10/1990 | Caniglia et al. | |
| 4,966,026 A * | 10/1990 | Nishino | 72/224 |
| 5,022,555 A * | 6/1991 | Greenbaum | 210/201 |
| 5,398,839 A * | 3/1995 | Kleyn | 220/560.03 |
| 5,547,096 A * | 8/1996 | Kleyn | 220/4.14 |
| 5,647,933 A | 7/1997 | Christensen | |
| 5,704,998 A * | 1/1998 | Gallagher, Jr. | 148/648 |
| 5,960,981 A | 10/1999 | Dodson et al. | |
| 6,138,859 A * | 10/2000 | Aulph et al. | 220/563 |
| 6,161,719 A * | 12/2000 | Madison | 220/567 |
| 6,241,117 B1 * | 6/2001 | Wickins et al. | 220/646 |
| 6,293,420 B1 | 9/2001 | Richter et al. | |
| 6,408,979 B1 | 6/2002 | Forbes et al. | |
| 6,431,388 B1 | 8/2002 | Spickelmire et al. | |
| 6,595,382 B2 * | 7/2003 | Ettlinger | 220/560.11 |
| 6,689,435 B2 * | 2/2004 | Iwasaki | 428/34.1 |
| 6,691,889 B1 * | 2/2004 | Falk | 220/563 |
| 7,111,750 B2 * | 9/2006 | Gulati et al. | 220/560.04 |
| 7,541,085 B2 | 6/2009 | Burdon | |
| 7,735,507 B2 * | 6/2010 | Hagenbuch | 137/15.08 |
| 7,819,272 B2 * | 10/2010 | Sugiura | 220/563 |
| 7,861,885 B2 * | 1/2011 | Borchert et al. | 220/562 |
| 8,636,162 B2 * | 1/2014 | Schoen et al. | 220/4.14 |
| 2002/0020705 A1 * | 2/2002 | Vorenkamp et al. | 220/4.14 |
| 2002/0066737 A1 * | 6/2002 | Stack et al. | 220/564 |
| 2002/0100759 A1 * | 8/2002 | Schmidt et al. | 220/564 |
| 2002/0125254 A1 * | 9/2002 | Hagano et al. | 220/562 |
| 2003/0038136 A1 * | 2/2003 | Bauer | 220/563 |
| 2004/0134920 A1 * | 7/2004 | Baron | 220/653 |
| 2006/0032538 A1 * | 2/2006 | Park | 137/590 |
| 2008/0035649 A1 * | 2/2008 | Ohlsson et al. | 220/564 |
| 2009/0134174 A1 * | 5/2009 | Kang et al. | 220/563 |
| 2009/0189384 A1 * | 7/2009 | Schoen et al. | 280/834 |
| 2009/0206097 A1 * | 8/2009 | Gebert et al. | 220/653 |
| 2009/0250458 A1 * | 10/2009 | Criel et al. | 220/4.13 |
| 2010/0045017 A1 * | 2/2010 | Rea | 280/830 |
| 2010/0237080 A1 * | 9/2010 | Gebert et al. | 220/562 |
| 2011/0062163 A1 | 3/2011 | Hewkin | |
| 2011/0168728 A1 * | 7/2011 | McDermott et al. | 220/653 |
| 2011/0303684 A1 | 12/2011 | Cragel et al. | |

FOREIGN PATENT DOCUMENTS

| | | | |
|---|---|---|---|
| JP | SHO 5732909 A * | 7/1982 | |
| JP | HEI 234443 A * | 3/1990 | |
| JP | H07257493 A | 10/1995 | |

* cited by examiner

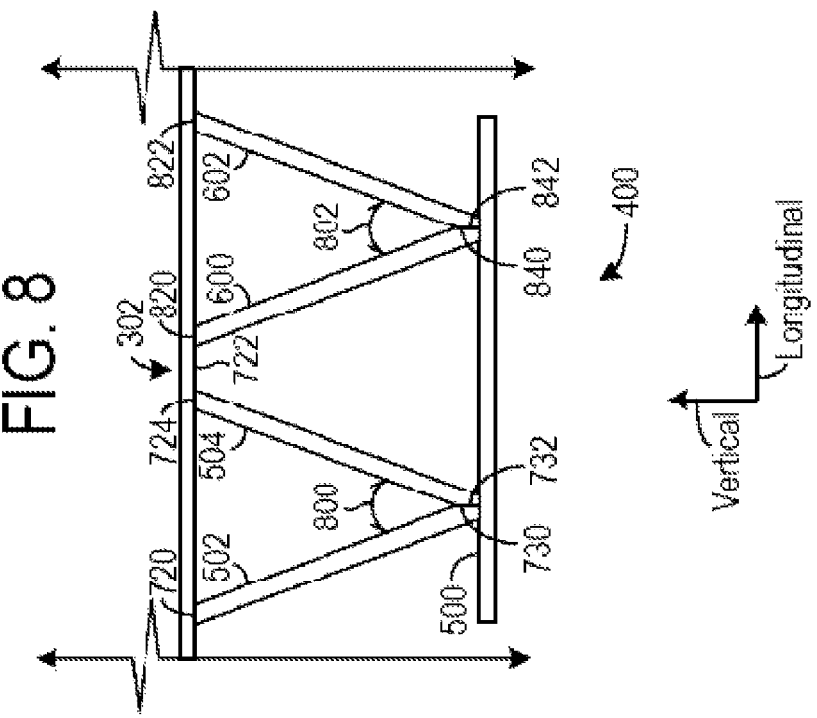
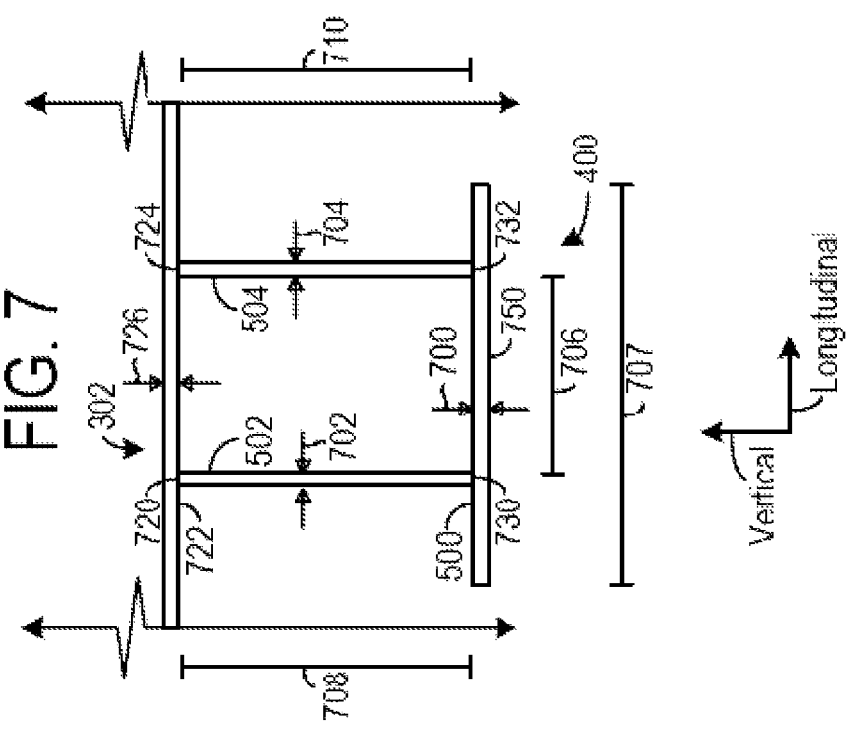

US 9,321,347 B2

COMPLIANCE STRUCTURE FOR A DISTENSIBLE FUEL TANK

CROSS REFERENCE TO RELATED APPLICATIONS

The present application is a continuation-in-part of U.S. patent application Ser. No. 13/597,233 filed Aug. 28, 2012, which is a continuation-in-part of U.S. patent application Ser. No. 12/815,283 filed Jun. 14, 2010, now U.S. Pat. No. 8,251,171, the entire contents of which are incorporated herein by reference for all purposes.

BACKGROUND/SUMMARY

Fuel tanks may experience increased pressure during certain operating conditions. The increased pressure may be caused by an increase in the temperature in a sealed fuel tank. The duration that a fuel tank is sealed may be increased in hybrid vehicles using both an electric motor and an internal combustion engine for motive power when compared to vehicles relying solely on internal combustion engines for motive power. The increase may be due, in part, to the sporadic use of the internal combustion engine in the hybrid vehicle. Consequently, the pressure in a fuel tank of a hybrid vehicle may reach levels that are many times greater than those experienced in systems where the fuel tank is routinely purged to the engine whenever necessary. In some circumstances the pressure in a fuel tank of a hybrid vehicle may be 15-20 times greater than the maximum values experienced by a fuel tank in a vehicle relying solely on an internal combustion engine for motive power.

Thicker fuel tanks have been used to withstand the increased pressure within the fuel tank, such as heavier gauge metal fuel tanks. However, the inventors herein have recognized various shortcomings of the above approach. For example, fuel tanks having increased wall thickness may not only increase vehicle costs, but may also increase the weight and size of the fuel tank. Moreover, the shape of the fuel tank housing may be selected based on the strength of the design rather than on the compactness of the design, thereby decreasing the compactness of the vehicle or the fuel tank's storage capacity. Consequently the vehicle's driving range may be decreased.

As such, various example systems and approaches are described herein. In one example, a distensible fuel tank included in a vehicle is provided. The distensible fuel tank includes a housing and a compliance structure coupled to the housing, the compliance structure including a base element coupled to a side of a structural element.

The compliance structure provides a desired amount of flexibility and strength to selected areas of the fuel tank. Additionally, structural characteristics of the compliance structure may be tuned to achieve specified fuel tank attributes. For instance, a thickness of the base element may not be equal to a thickness of the structural element, in one example. In this way, the compliance structure may be tuned for a variety of fuel tank geometries, and therefore may be used across a wide range of fuel tanks. As a result, the applicability of the fuel tank is increased, thereby reducing fuel tank production costs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 7 shows a side view of one of the compliance structures included in the compliance structure assembly shown in FIG. 4;

FIG. 8 shows a side view of one of the compliance structures included in the compliance structure assembly shown in FIG. 6.

FIGS. 3-17 are drawn approximately to scale, however other relative dimension may be used, if desired.

DETAILED DESCRIPTION

A fuel tank with a compliance structure is disclosed herein. The compliance structure is coupled to an external or internal surface of a fuel tank housing and includes a base element coupled to a side of a structural element. Fuel tank attributes such as deflection characteristics, structural integrity, material construction (e.g., material tolerances), heat transfer characteristics, etc., may be predetermined and the structural characteristics of the compliance structure may be subsequently tuned to achieve the desired attributes. For example, a thickness, spacing, angular position, vertical height, etc., of the base element and structural element may be varied to tune the compliance structure to the shape of a specified fuel tank. In this way, the features of the compliance structure may be adapted for a wide range of fuel tanks, thereby increasing the fuel tanks applicability. Moreover, the likelihood of fuel tank degradation (e.g., deformation, housing rupture, etc.,) caused by over-pressure conditions may be reduced when a compliance structure is used in a fuel tank.

Figure 1:
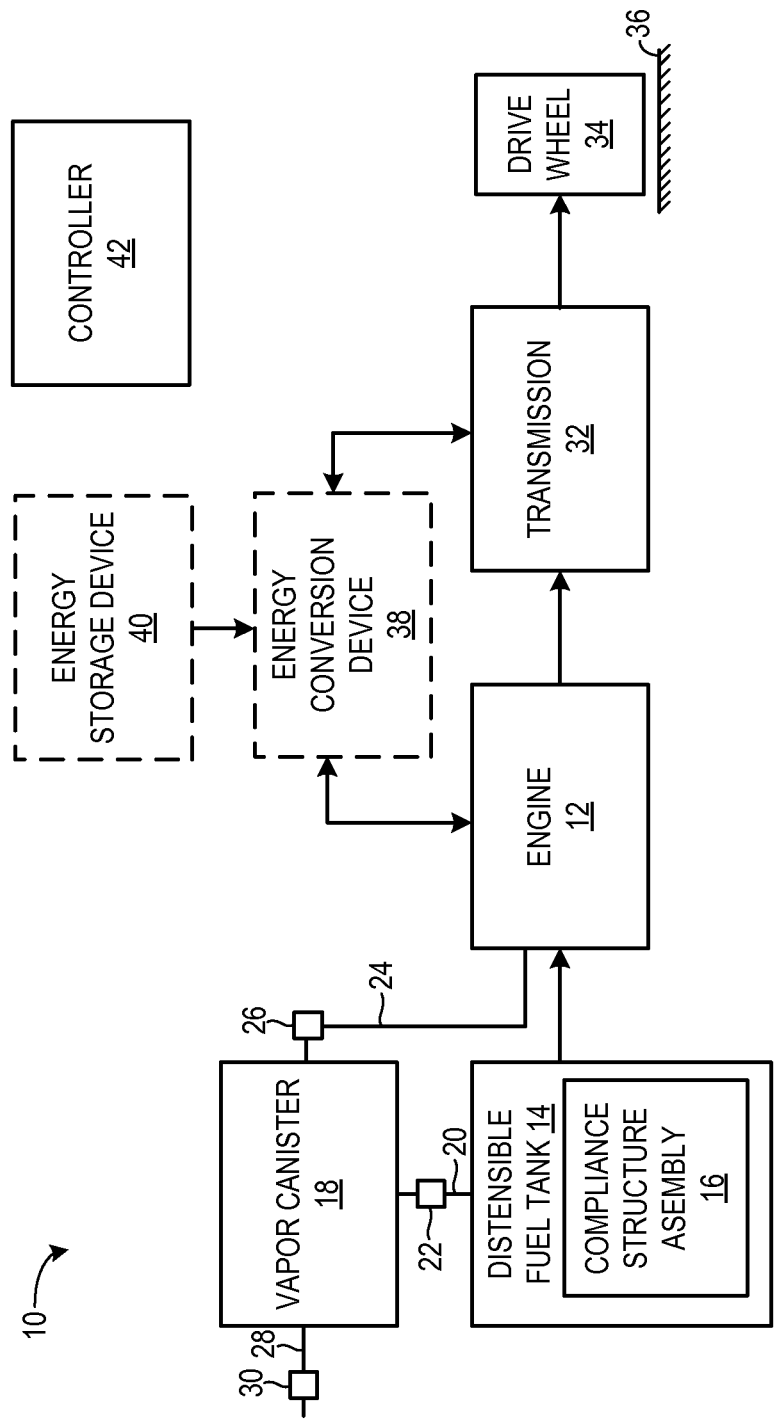
FIG. 1 shows a schematic depiction of a system in a vehicle including a distensible fuel tank having a distensible structure.

Referring to FIG. 1, a system 10 for a vehicle is shown. The system includes an internal combustion engine 12 coupled to a distensible fuel tank 14. The fuel tank may include a distensible structure assembly 16 (e.g., lattice structure assembly) for providing increased structural integrity as well as a predetermined amount of compliance to the fuel tank, discussed in greater detail herein with regard to FIG. 3-6.

System 10 may further include a vapor canister 18. The vapor canister may be fluidly coupled to fuel tank 14 via a tank conduit 20 including a fuel tank isolation valve 22. The vapor canister may also be coupled to the engine via an engine conduit 24 including a canister purge valve 26. Furthermore, a vent conduit 28 including a canister vent valve 30 may be coupled to the vapor canister. The vent conduit may be in fluidic communication with the surrounding air.

However in other examples, the system 10 may not include the tank conduit 20 and the fuel isolation valve 22. In such an example, the distensible fuel tank 14 is not in fluidic communication (e.g., direct fluidic communication) with the vapor canister 18. Therefore, the distensible fuel tank 14 is fluidly separated (e.g., isolated) from the vapor canister 18. Such a system may be referred to as a non-integrated refueling only system (NIRCOS). It will be appreciated that in this example a refueling tube may be in fluidic communication with the vapor canister 18. The refueling tube may provide fuel to the distensible fuel tank 14. Therefore, vapors may be directed to the vapor canister 18 during refueling in the NIRCOS.

It will be appreciated that the aforementioned valves (i.e., fuel tank isolation valve 22, canister purge valve 26, and canister vent valve 30) may be selectively operated to perform the following operations: vapor canister purging, fuel tank isolation, and refueling. Vapor canister purging operation may be performed when the internal combustion engine is in operation and a sufficient vacuum is generated in the engine's intake manifold. However, it will be appreciated that in certain vehicles, such as hybrid vehicles, the internal combustion engine may be sporadically operated during vehicle operation.

Continuing with FIG. 1, internal combustion engine 12 may also be coupled to a transmission 32. The transmission may be a manual transmission, automatic transmission, or combinations thereof. Further, various additional components may be included in the transmission, such as a torque converter, and/or other gears such as a final drive unit, etc. Transmission 32 is shown coupled to drive wheel 34, which in turn is in contact with road surface 36. Although a single drive wheel is depicted it will be appreciated that a plurality of drive wheels may be coupled to transmission 32.

In this example embodiment, system 10 also includes an energy conversion device 38, which may include a motor, a generator, among others and combinations thereof. Energy conversion device 38 is further shown coupled to an energy storage device 40, which may include a battery, a capacitor, a flywheel, a pressure vessel, etc. However in other embodiments system 10 may not include the energy conversion device and the energy storage device. Hence, in some embodiments the internal combustion engine may be the sole source of motive power in the vehicle.

Energy conversion device 38 can be operated to absorb energy from vehicle motion and/or the engine and convert the absorbed energy to an energy form suitable for storage by the energy storage device (i.e., provide a generator operation). The energy conversion device can also be operated to supply an output (power, work, torque, speed, etc.) to drive wheel 34 and/or engine 12 (i.e. provide a motor operation). It will be appreciated that the energy conversion device may, in some embodiments, include only a motor, only a generator, or both a motor and generator, among various other components used for providing the appropriate conversion of energy between the energy storage device and the drive wheel and/or engine.

The depicted connections between engine 12, energy conversion device 38, transmission 32, and drive wheel 34 indicate transmission of mechanical energy from one component to another, whereas the connections between the energy conversion device and the energy storage device may indicate transmission of a variety of energy forms such as electrical, mechanical, etc. For example, torque may be transmitted from engine 12 to drive the drive wheel 34 via transmission 32. As described above energy storage device 40 may be configured to operate in a generator mode and/or a motor mode. In a generator mode, energy conversion device 38 absorbs some or all of the output from engine 12 and/or transmission 32, which reduces the amount of drive output delivered to drive wheel 34, or the amount of braking torque to the drive wheel. Such operation may be employed, for example, to achieve efficiency gains through regenerative braking, improved engine efficiency, etc. Further, the output received by the energy conversion device may be used to charge energy storage device 40. In motor mode, the energy conversion device may supply mechanical output to engine 12 and/or transmission 32, for example by using electrical energy stored in an electric battery. In some examples, combustion cycles in the engine may be inhibited in motor mode.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1 may be controlled by a vehicle controller 42.

It will be appreciated that the vehicle controller may be configured to seal the fuel tank during certain operating conditions, such as when engine 12 is not providing motive power to the vehicle, to decrease evaporative emissions. For example, the vehicle may be operated in the motor mode in which the energy conversion device provides motive power to the vehicle and combustion cycles in the engine are substantially inhibited. Inhibiting combustion cycles in the engine may include inhibiting fuel injection events, inhibiting operation of the fuel delivery system pumps, and isolating the fuel delivery system. Isolation of the fuel tank may include substantially inhibiting fluidic communication with the fuel delivery system and the atmosphere. In other words, the fuel tank may be sealed. Furthermore it will be appreciated that operation of internal combustion engine 12 may be inhibited when the vehicle is travelling below a threshold speed or when the vehicle has not surpassed a threshold range corresponding to an amount of energy stored within the energy storage device. Therefore, when the vehicle is driven for a short duration or below a threshold speed, the fuel tank may be sealed. During the aforementioned conditions fluctuations in temperature may cause the pressure in the fuel tank to increase above atmospheric levels. In some vehicles the fuel tank may experience pressure 15-20 times greater than the atmospheric pressure.

Figure 2:
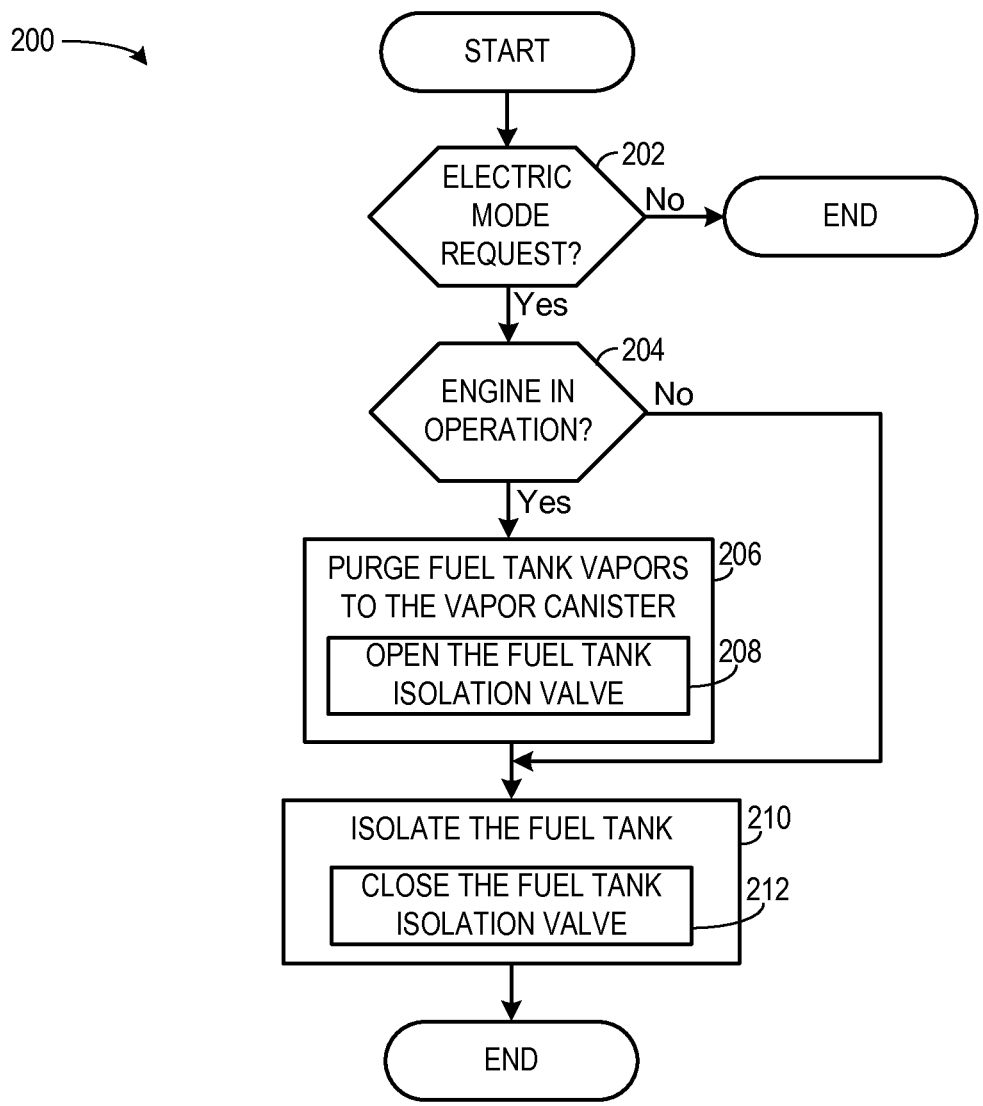
FIG. 2 shows a method for operation of a vehicle.

FIG. 2 shows a method 200 for operation of a vehicle. Method 200 may be performed via the systems and components described herein. However, in other examples method 200 may be implemented via other suitable systems and components.

At 202 the method includes determining if an electric mode has been requested. It will be appreciated that an electric mode may include a mode of vehicle operation in which an electric motor is providing motive power to the vehicle and the internal combustion engine is not in operation.

If it is determined that an electric mode request has not been made (NO at 202) the method ends. However, if it is determined that an electric mode request has been made (YES at 202) the method proceeds to 204 where the method includes determining if the engine is in operation. If the engine is in operation (YES at 204) the method includes at 206 purging fuel tank vapors to the vapor canister. In some examples, purging fuel tank vapors to the vapor canister may include at 208 opening the fuel tank isolation valve. However, it will be appreciated that in other examples, other valves may be operated to purge fuel tank vapors to the vapor canister.

Next at 210 the method includes isolating the fuel tank. In some examples isolating the fuel tank may include at 212 closing the fuel tank isolation valve. However it will be appreciated that in other embodiments alternate valves may be operated to isolate the fuel tank. However, if it is determined that the engine is not in operation (NO at 204) the method proceeds to 210. After 210 method 200 ends or alternatively, in other embodiments, returns to the start.

Method 200 may decrease evaporative emission from a hybrid type vehicle via selectively transferring vapors in the fuel tank to the vapor canister during engine operation and sealing the fuel tank and vapor canister while the vehicle is utilizing the electric motor for motive power. The duration that the fuel tank remains sealed may be greater in an electric vehicle utilizing method 200 when compared to a vehicle relying solely on an internal combustion engine for motive power.

Figure 3:
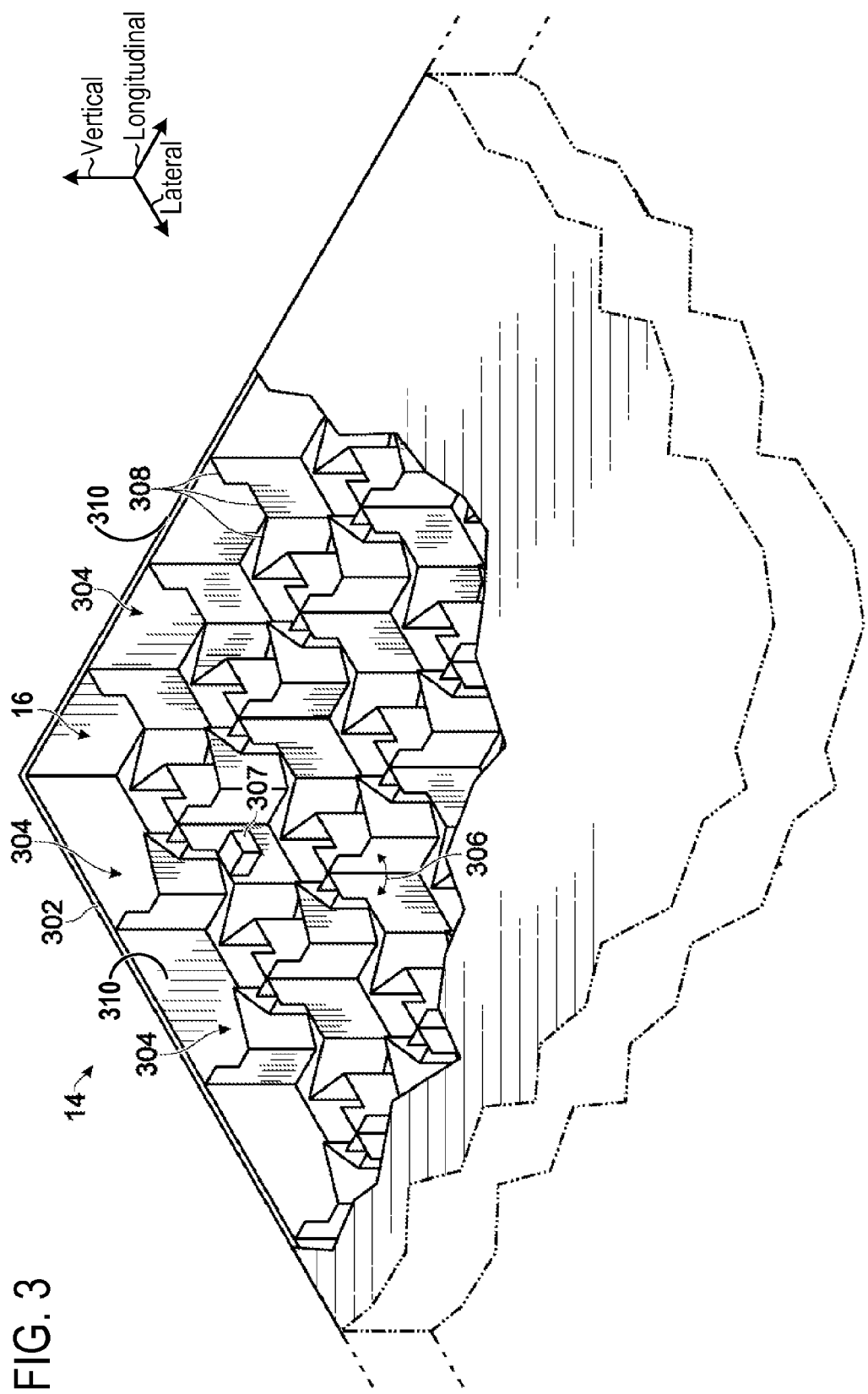
FIG. 3 shows an illustration of a distensible fuel tank including a compliance structure assembly.

FIG. 3 shows an illustration of distensible fuel tank 14. Fuel tank 14 may include a housing 302 enclosing a compliance structure assembly 16. In the example depicted in FIG. 3 the compliance structure assembly may be referred to as a lattice structure. The lattice structure 16 provides controlled support to the fuel tank. The lattice structure may substantially span a portion of an interior of the fuel tank defined by the housing. In the depicted embodiment, a section of the housing has been removed to reveal the interior of the fuel tank and the internal lattice structure. However, it will be appreciated that the housing does in fact enclose the lattice structure. Housing 302 may be constructed out of a material that expands and contracts during operation of the vehicle. For example, housing 302 may be constructed out of a polymeric material, such as a high density polyethylene (HDPE), a metal, or a combination thereof. Additionally, the lattice structure may be constructed out of a suitable material such as a polymeric material, a metal, or a combination thereof.

The lattice structure may include a plurality of intersecting wall members 304. In some examples, the wall members may be conjoined. However, in other examples, the wall members may be attached in another suitable manner. In the depicted embodiment, angle 306 formed by the intersection of the wall member is substantially perpendicular. In this way, multi-axial loading of the lattice structure may be equally distributed. In one example, the intersection may include two pairs of identical supplementary angles. A sub-assembly 307 may be coupled to one or more of wall members 304. The sub-assembly may be a sensor, an internal mounted fuel or vapor line, etc.

Each wall member may include a plurality of panels 308 arranged in a repeating pattern. In the depicted embodiment the sides of the panels are planar. However in other embodiments the sides of the panels may have another suitable shape. For example, the panels may be curved. Further, in the depicted embodiment wall members 304 are positioned substantially perpendicular to housing walls 310. In this way, the wall members provide structural support to the fuel tank housing.

Although a rectangular fuel tank is illustrated it will be appreciated that fuel tanks having alternate geometries may be used in other embodiments such as saddle shaped fuel tank. Furthermore, it will be appreciated that fuel tank may be positioned in a number of orientations in the vehicle.

Figure 4:
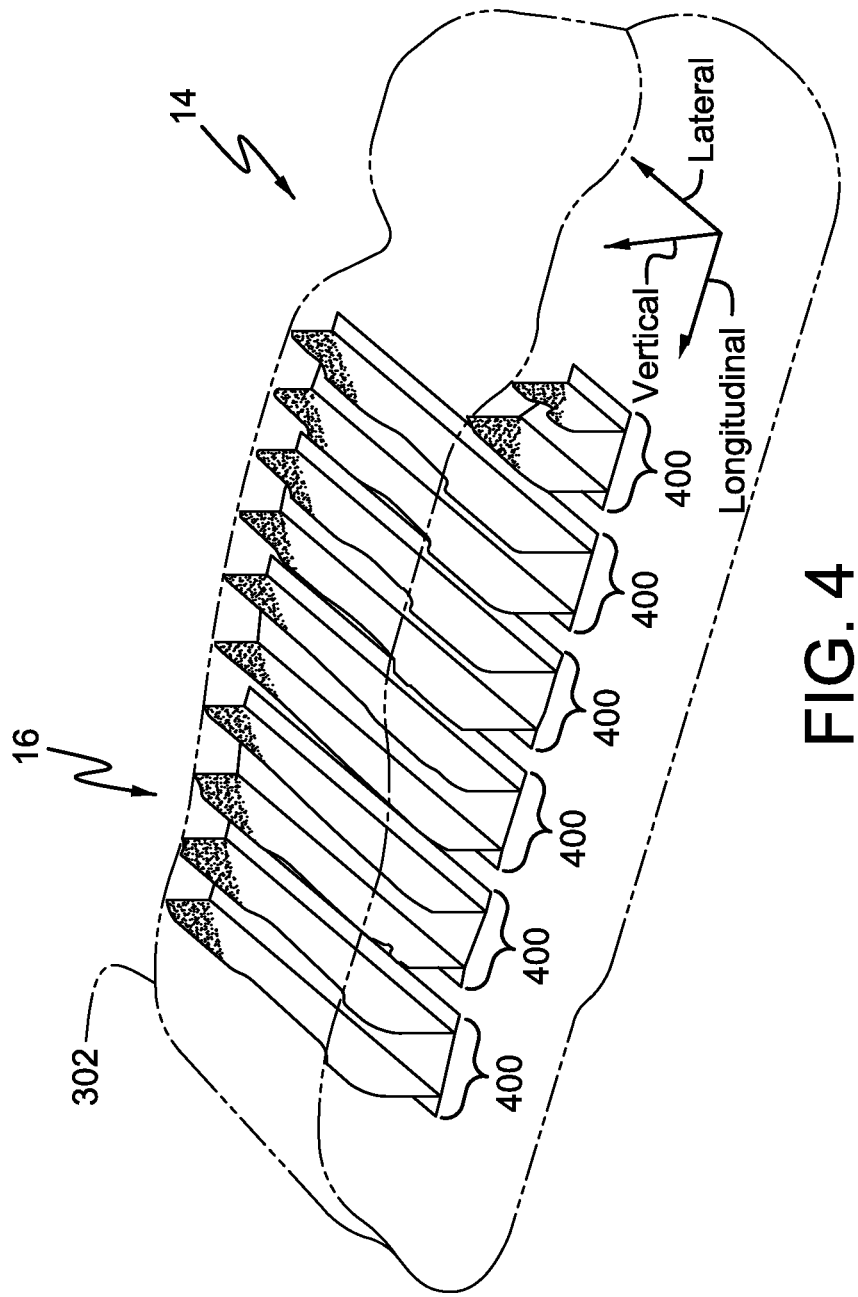
FIG. 4 shows an illustration of another example fuel tank including another compliance structure assembly.

FIG. 4 shows another example of the distensible fuel tank 14. The fuel tank 14 may include a housing 302 enclosing the compliance structure assembly 16 providing controlled support as well as compliance to the fuel tank. Various structural features of the compliance structure assembly 16 may be adapted for use with different fuel tank geometries and desired structural properties of the fuel tank.

The compliance structure assembly 16 includes a plurality of compliance structures 400, in the depicted example. However, in other examples the compliance structure assembly may include only a single compliance structure. As shown, the compliance structure assembly 16 is positioned in an interior volume of the fuel tank 14. Specifically in one example, the compliance structures 400 may laterally span the internal volume of the fuel tank. However, in other examples the compliance structure assembly 16 may be positioned externally. The compliance structure assembly 16 may substantially span a portion of an interior of the fuel tank defined by the housing. In the depicted example, a section of the housing has been removed to reveal the interior of the fuel tank and the internal distensible structure. However, it will be appreciated that the housing does in fact enclose the distensible structure. The housing 302 may be constructed out of a material that expands and contracts during operation of the vehicle. For example, housing 302 may be constructed out of a polymeric material, such as a high density polyethylene (HDPE), a metal, or a combination thereof. Additionally, the distensible structure may be constructed out of a suitable material such as a polymeric material, a metal, or a combination thereof. A vertical axis, lateral axis, and longitudinal axis are provided for reference in FIG. 4.

Figure 5:
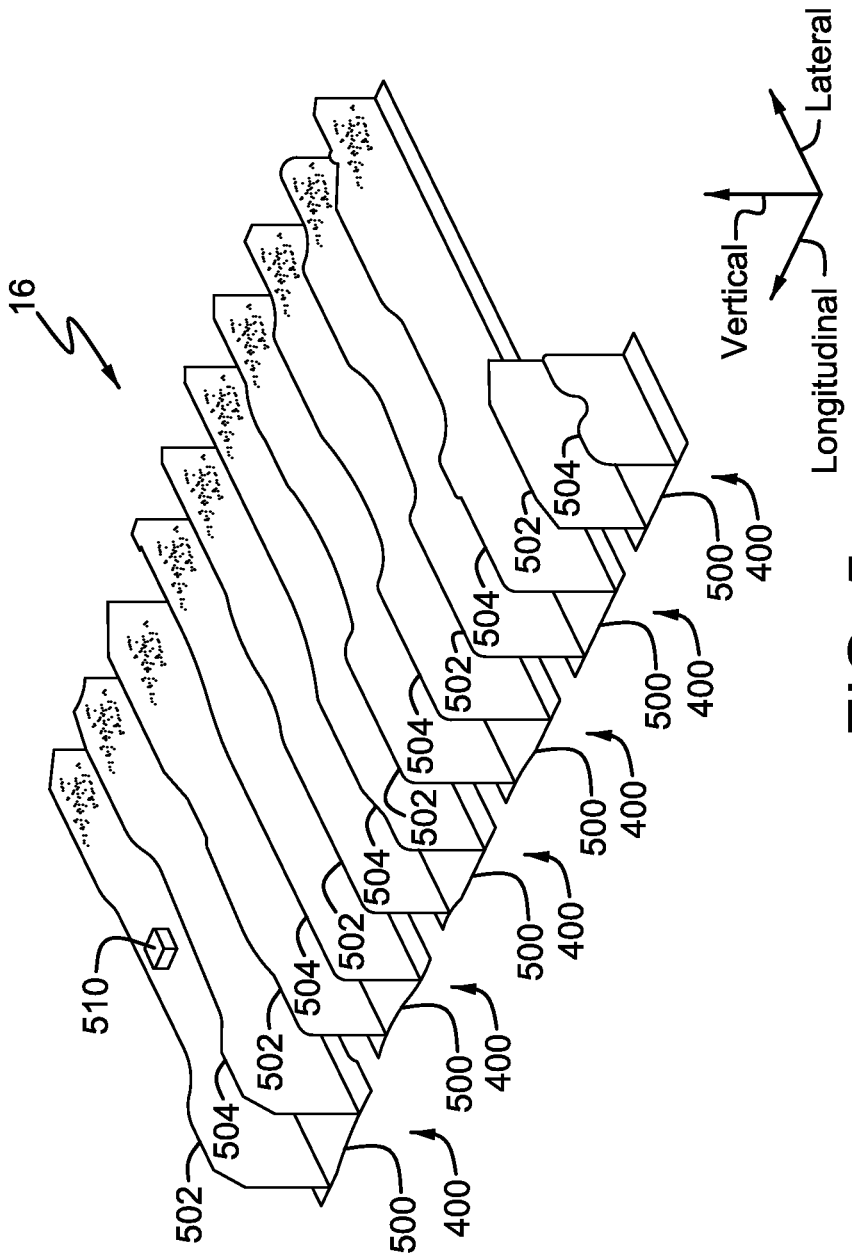
FIG. 5 shows the compliance structure assembly shown in FIG. 4 without the housing of the fuel tank.

FIG. 5 shows the compliance structure assembly 16 shown in FIG. 4 without the housing 302 of the fuel tank 14. However, as previously discussed the compliance structure assembly 16 may be coupled to an external or internal surface of the housing of the fuel tank 14, shown in FIG. 4.

The compliance structure assembly 16 includes a plurality of compliance structures 400, as discussed above with regard to FIG. 4. The plurality of compliance structures are essentially arranged in series. Specifically, the compliance structures are equally spaced. However, other compliance structure positions have been contemplated. Further in other examples the compliance structure assembly 16 may include only a single compliance structure.

Each compliance structure includes a base element 500 coupled to a first structural element 502. The base element 500 may act as a stiffening element, thereby increasing the structural integrity of the fuel tank. Each of the compliance structures 400, shown in FIG. 5, further includes a second structural element 504 coupled to the base element 500. However, compliance structures with only a single structural element have been contemplated. It will be appreciated that in other examples, a single base element may be coupled to all of the structural elements in the compliance structure assembly 16. Additionally, the base element 500 may not be coupled to the fuel tank housing, in some examples. However, in other examples a portion of the base element may be coupled to the fuel tank housing.

In each compliance structure, the first and second structural elements (502 and 504) shown in FIG. 2 are arranged perpendicular to the base element 500. However, other structural element orientations may be used, in other examples.

As shown, a vertical height of the first and second structural elements may vary along their lengths. Additionally, the vertical height of the structural elements may vary between structural elements along their length. Thus, a height of a side of the first structural element along its length may vary from a height of a side of the second structural element along its length. A vertical axis is provided for reference in FIG. 5. The vertical height may be measured along the vertical axis. However, other orientations have been contemplated. A lateral axis and longitudinal axis are also provided for reference. It will be appreciated that the compliance structure assembly 16 and/or the fuel tank 14 may be arranged at a variety of orientations in the vehicle.

The compliance structure assembly 16 enables the fuel tank to be dimensionally compliant, allowing the fuel tank to shrink and expand. In other words, the compliance structure assembly 16 may provide a desired amount of strength and flexibility to the fuel tank 14. Thus, various features of the compliance structure assembly may be tuned to achieve desired end-use fuel tank characteristics, such as a desired amount of rigidity and flexibility in selected portions of the fuel tank 14. For instance, a deflection criteria may be determined for a selected pressure or pressure range and the characteristics of the compliance structure assembly 16 may be adjusted to meet the deflection criteria.

The lateral length of the base elements and/or structural elements may vary between compliance structures to facilitate tuning of the compliance structure. The longitudinal length of the base elements and/or structural elements (502 and 504) may also vary between the compliance structures. Furthermore, the longitudinal separation of the first and second structural elements (502 and 504) may vary between the compliance structures 400. The vertical height of the structural elements may also vary between the compliance structures, in some examples.

A sub-assembly 510 (e.g., internal sub-assembly) may be coupled to the compliance structure assembly 16. The sub-assembly 510 may be a sensor (e.g., temperature sensor, fuel level sensor, and/or pressure sensor), a vapor valve, a vapor line, etc. It will be appreciated, that the sub-assembly may be compliantly attached to the compliance structure without inhibiting the differential movement of the compliance structure, if desired. The compliances structures may also reduce fuel movement (e.g., fuel sloshing) in the fuel tank, which may improve the accuracy of fuel level measurements and/or improve fuel pump operation.

Additional structural elements may be included in the compliance structures 400 in some examples. For instance, a structural element arranged perpendicular to the first structural element and extending in a longitudinal direction may be included in one or more of the compliance structures.

Figure 6:
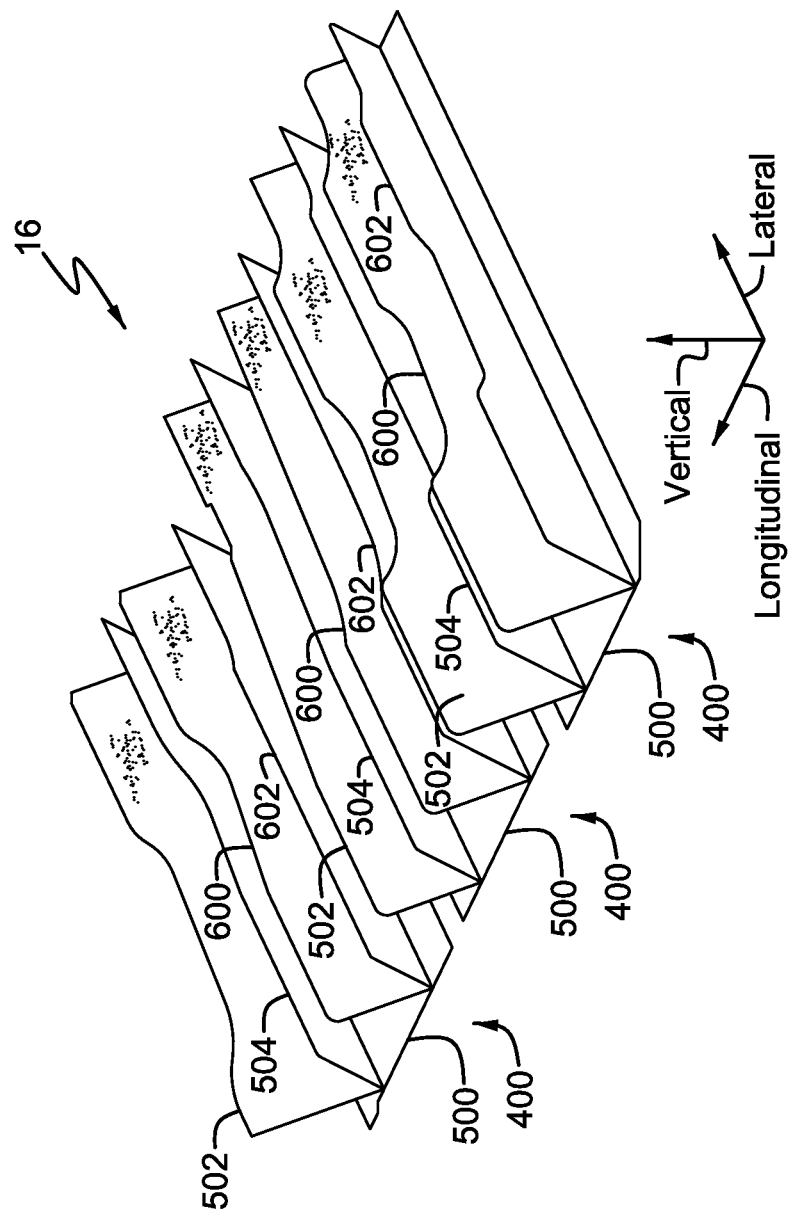
FIG. 6 shows another example compliance structure assembly.

FIG. 6 shows a second example compliance structure assembly 16 without the housing 302 of the fuel tank 14. However, as previously discussed the compliance structure assembly 16 may be coupled to an external or internal surface of the housing of the fuel tank. Again, the compliance structure assembly 16 includes a plurality of compliance structures 400. Each of the compliance structures 400 includes the base element 500, the first structural element 502, and the second structural element 504. Each compliance structure 400 shown in FIG. 6 further includes a third structural element 600 and a fourth structural element 602. The first structural element 502 forms an angle with the second structural element 504. Likewise, the third structural element 600 forms an angle with the fourth structural element 602. The angles may be equivalent, in one example. However, in other examples the angles may not be equivalent. As shown, the angles are non-straight. Specifically, the angles may be less than 60 degrees.

FIG. 7 shows a side view of one of the compliance structures 400 shown in FIG. 4. A thickness 700 of the base element 500 is illustrated. Likewise a thickness 702 of the first structural element 502 and a thickness 704 of the second structural element 504 are also shown. The thickness 700 of the base element may not be equal to the thicknesses (702 and 704) of the first and/or second structural elements (502 and 504).

A longitudinal separation 706 between the first and second structural elements is shown. A longitudinal axis and a vertical axis are provided for reference in FIG. 7. The longitudinal separation 706 between the first and second structural elements may be adjusted based on desired fuel tank characteristics. A longitudinal length 707 of the base element 500, is also shown. The longitudinal length 707 may be also be altered based on desired fuel tank characteristics.

A height 708 of the first structural element 502 is also shown in FIG. 7. Likewise, a height 710 of the second structural element 504 is also illustrated. The height 708 and/or height 710 maybe adjusted based on desired fuel tank characteristics (e.g., flexibility, strength, heat transfer properties, etc.). The longitudinal length of the base element 500 may also be altered based on desired fuel tank characteristics. Additionally, the heights of the first and/or second structural elements may vary along the lateral length of the structural elements to achieve desired fuel tank characteristics. Further in one example, a moment of inertia of the compliance structure 400 may be selected to achieve fuel tank flexibility and/or strength design objectives.

A side 720 of the first structural element 502 is shown coupled to a surface 722 of the housing 302 of the fuel tank. Likewise, a side 724 of the second structural element 504 is shown coupled to the surface 722 of the housing 302. As previously discussed, the surface may be an external or internal surface. A thickness 726 of the housing 302 is also shown in FIG. 7.

Additionally, a second side 730 of the first structural element 502 and a second side 732 of the second structural element 504 are both coupled to the base element 500. The first structural element 502 and the second structural element 504 are both arranged at a perpendicular angle with regard to the base element 500. However, other relative orientations between the structural elements and the base element have been contemplated.

In some examples, each of the compliance structures may be extruded. Further in some examples, the housing 302 of the fuel tank may be extruded. In one example, the direction of extrusion of the housing may be substantially parallel to the direction of extrusion of the compliance structures. Specifically, in one example the housing 302 may be manufactured via extrusion blow molding. Thus, in some examples, the housing may be extruded in a parison. In one example, the first and second structural elements shown in FIG. 7 may be arranged perpendicular to the direction of parison extrusion of the housing. However, other manufacturing techniques and extrusion orientations have been contemplated. Further in one example, the base element 500 may be welded to the first structural element 502 and/or the second structural element 504. Thus, the base element 500, the first structural element 502, and the second structural element 504 may form a continuous piece of material.

As shown, the first structural element 502 and the second structural element 504 is arranged perpendicular to the surface 722 of the housing 302. However, other structural element positions may be used, in other examples. Furthermore, the base element 500 is shown spaced away from the surface 722 of the housing 302. However, in other examples the base element 500 may be coupled to the housing. Furthermore, the base element 500 may be perpendicular to the surface 302 of the housing 302. Additionally, the first structural element 502 and the second structural element 504 may be unified at their edges and closed by the base element 500 thereby forming a boxed beam section.

Additionally, the base element 500, the first structural element 502 and the second structural element 504 are planar, in the example illustrated in FIG. 7. Specifically, the base structure 500 includes a bottom surface 750 which may be planar.

However, in other examples the base element 500, the first structural element 502 and/or the second structural element 504 may be non-planar.

FIG. 8 shows a side view of one of the compliance structures 400 shown in FIG. 6 attached to the housing 302 of the fuel tank. The angle 800 between the first structural element 502 and the second structural element 504 is shown. Likewise, the angle 802 between the third structural element 600 and the fourth structural element 602 is also shown. The angle 800 is substantially equivalent to the angle 802 in the depicted example. However, in other examples the angles may not be equivalent. The angles (800 and 802) and/or the vertical height of the first structural element 502, the second structural element 504, the third structural element 600, and/or fourth structural element 602 may be selected based on desired fuel tank characteristics (e.g., flexibility, structural integrity, geometry, etc.) as discussed above. A vertical axis and longitudinal axis are provided for reference. It will be appreciated that the angle and the vertical heights of the structural elements coupled to one another may determine the longitudinal separation of the structural elements. The longitudinal separation of the second structural element 504 and the third structural element 600 may also be selected based on fuel tank design specifications.

As shown, the sides (720 and 724) of the first structural element 502 and the second structural element 504, respectively are shown coupled to the surface 722 of the housing 302. Likewise, a side 820 of the third structural element 600 and a side 822 of the fourth structural element 602 are shown coupled to the surface 722 in FIG. 8. It will be appreciated that in some examples the base element 500 may not be included in the compliance structure 400 shown in FIG. 8.

As shown, the second side 730 of the first structural element 502 and the second side 732 of the second structural element 504 are coupled to one another, thereby forming the angle 800. Likewise, a second side 840 of the third structural element 600 is coupled to a second side 842 of the fourth structural element 602, thereby forming angle 802. The second sides (730, 732, 840, and 842) are also coupled to the base element 500, in the depicted example.

Figure 9:
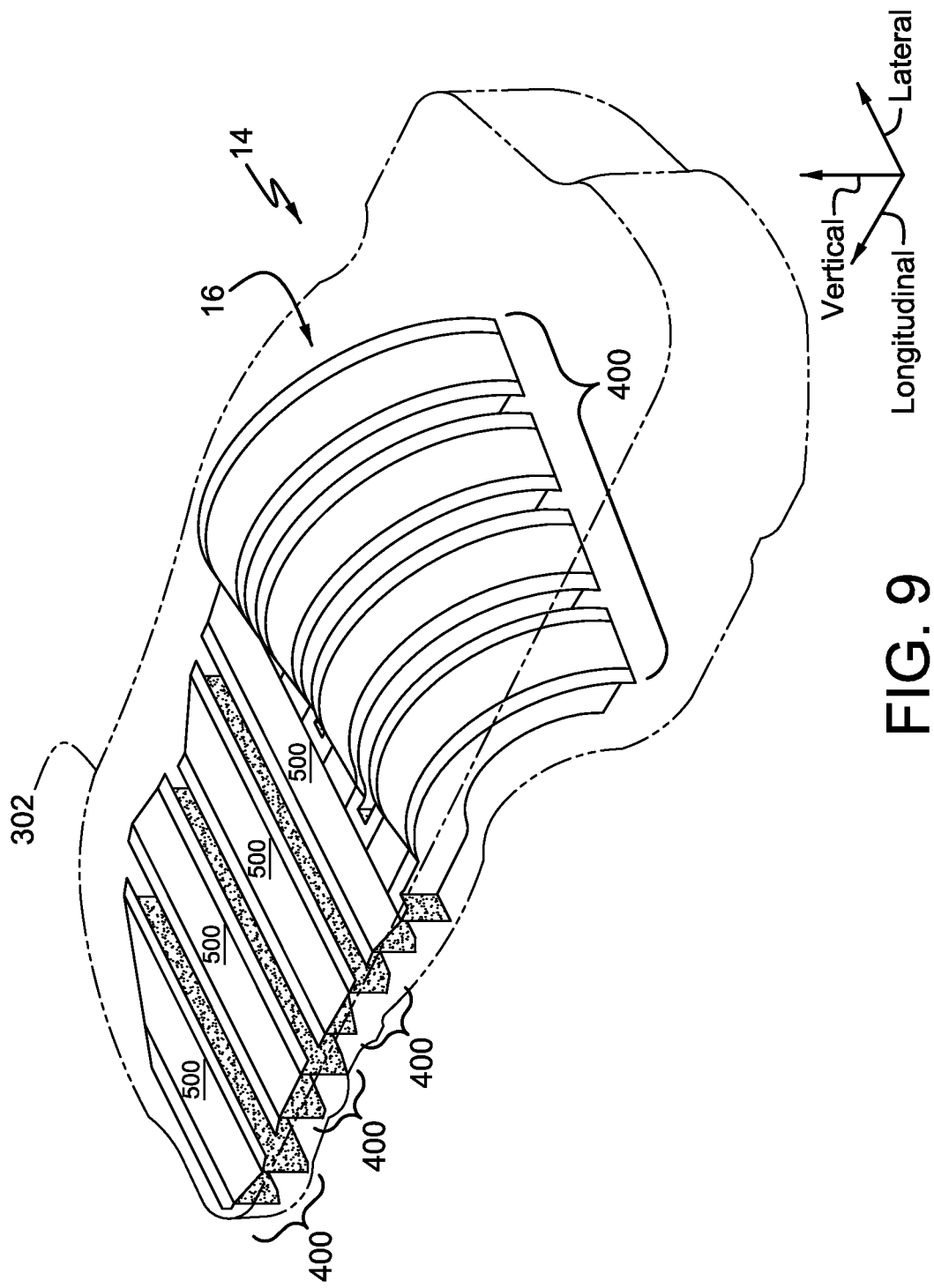
FIGS. 9-17 show additional example fuel tanks having compliance structure assemblies.

FIG. 9 shows another example fuel tank 14 including a compliance structure assembly 16 coupled to the housing 302 of the fuel tank. The compliance structure assembly 16 includes a plurality of compliance structures 400.

As illustrated, the contours of each of the compliance structures 400 may be selected to conform to the geometry of the housing 302. As shown, a portion of the base elements 500 included in one of the compliance structures 400 are curved (e.g., convex) to conform to the geometry of the housing 302 and another portion of the base elements 500 are substantially planar. However, other base structure geometries have been contemplated. The contours of the compliance structure assembly 16 may be chosen to provide a desired amount of compliance to selected areas of the fuel tank. As a result, the fuel tank may have desirable structural characteristics.

Figure 10:
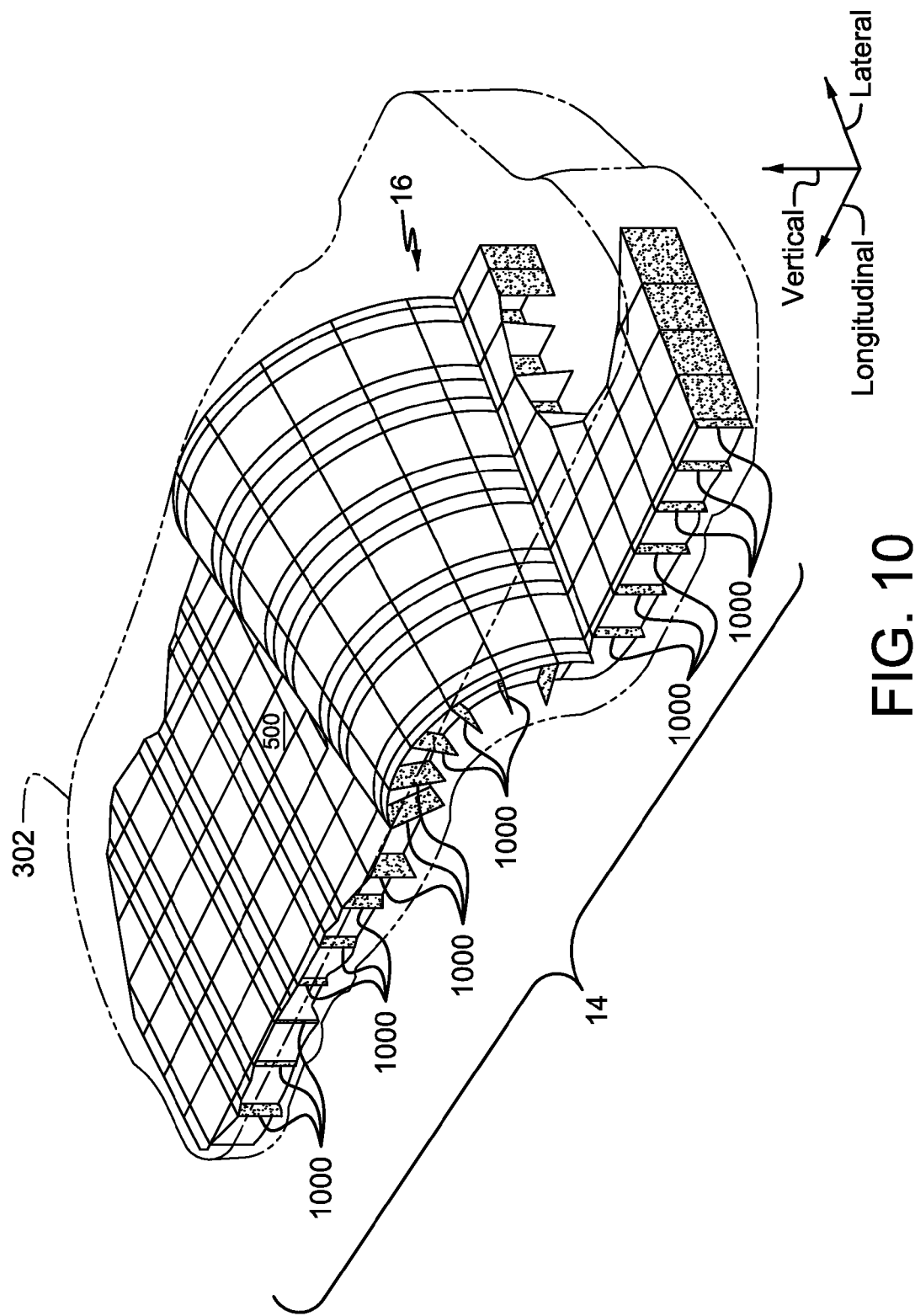

FIG. 10 shows another example fuel tank 14 including a compliance structure assembly 16 coupled to the housing 302 of the fuel tank. The compliance structure assembly 16 includes a compliance structure 400 connected via a single base element 500 and a plurality of structural elements 1000. As illustrated, the contours of each of the compliance structure 400 may be designed to fit to the geometry of the housing 302.

Figure 11:
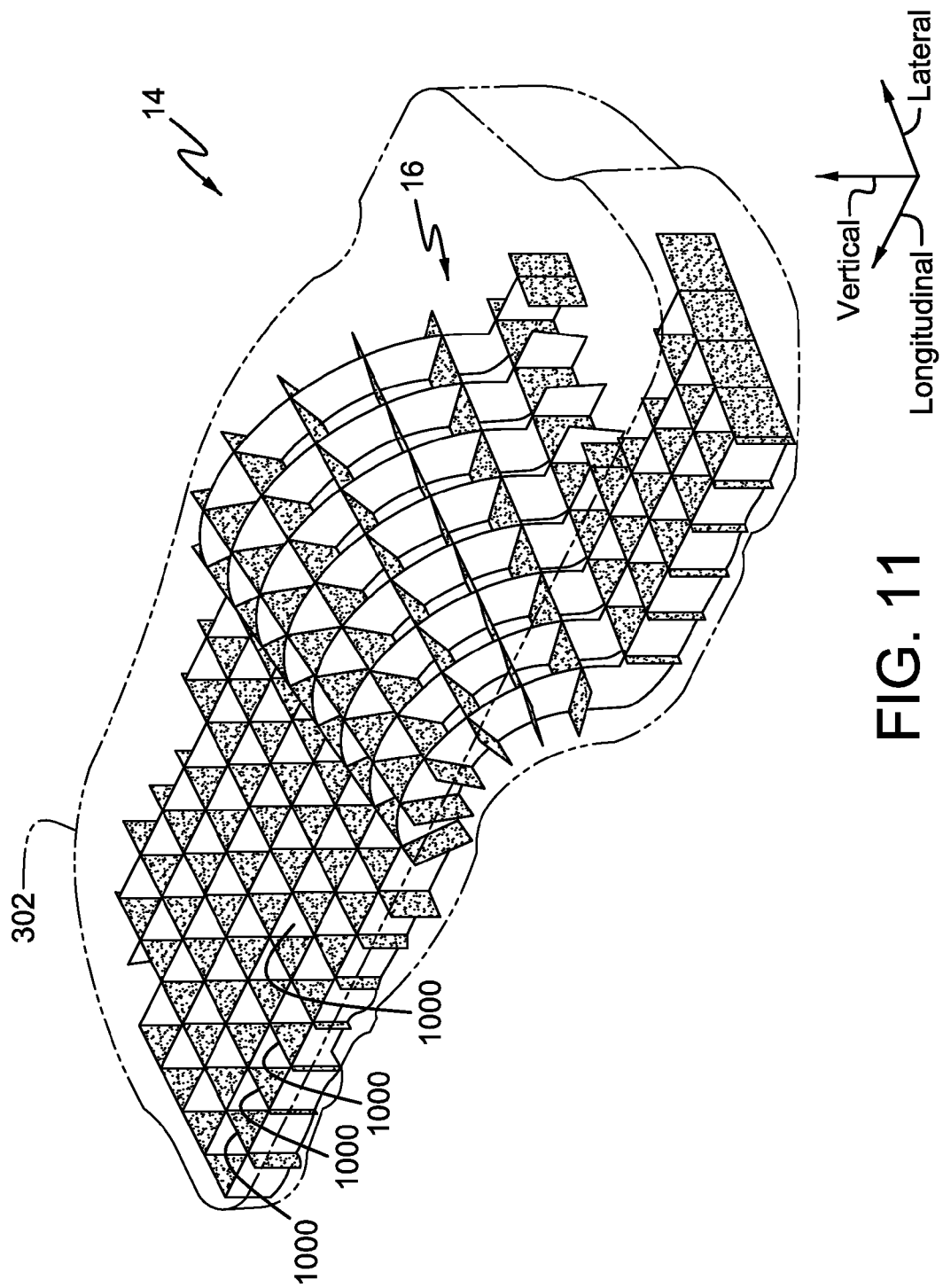

FIG. 11 shows the example fuel tank 14 depicted in FIG. 10 with the base element 500 removed to facilitate viewing of the underlying structural elements 1000 in the compliance structure assembly 16. The housing 302 of the fuel tank is also depicted.

Figure 12:
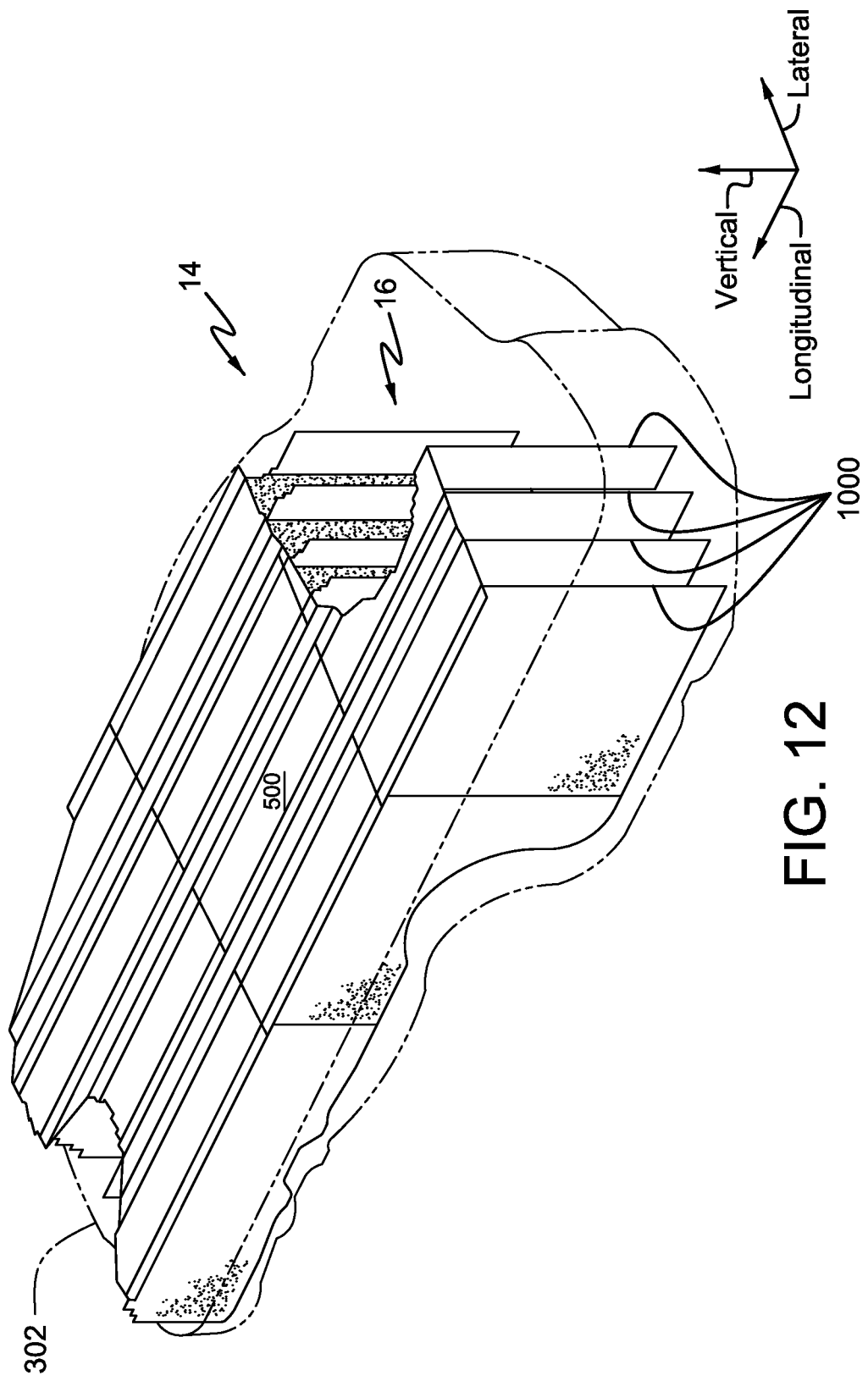

FIG. 12 shows another example of the fuel tank 14 including the housing 302 and the compliance structure assembly 16. As shown, the compliance structure assembly 16 includes a single base element 500 and the plurality of structural elements 1000. The base element 500 is positioned perpendicular to the plurality of structural elements 1000. However, other relative orientations have been contemplated.

As shown, the compliance structure assembly 16 is positioned inside as well as outside of the housing 302. Specifically, the base element 500 is positioned outside of the housing 302 and a portion of the structural elements 1000 are positioned inside of the housing and a portion of the structural elements 1000 are positioned inside of the housing. However, in other example the base element and/or structural elements may be fully enclosed by the housing.

Figure 13:
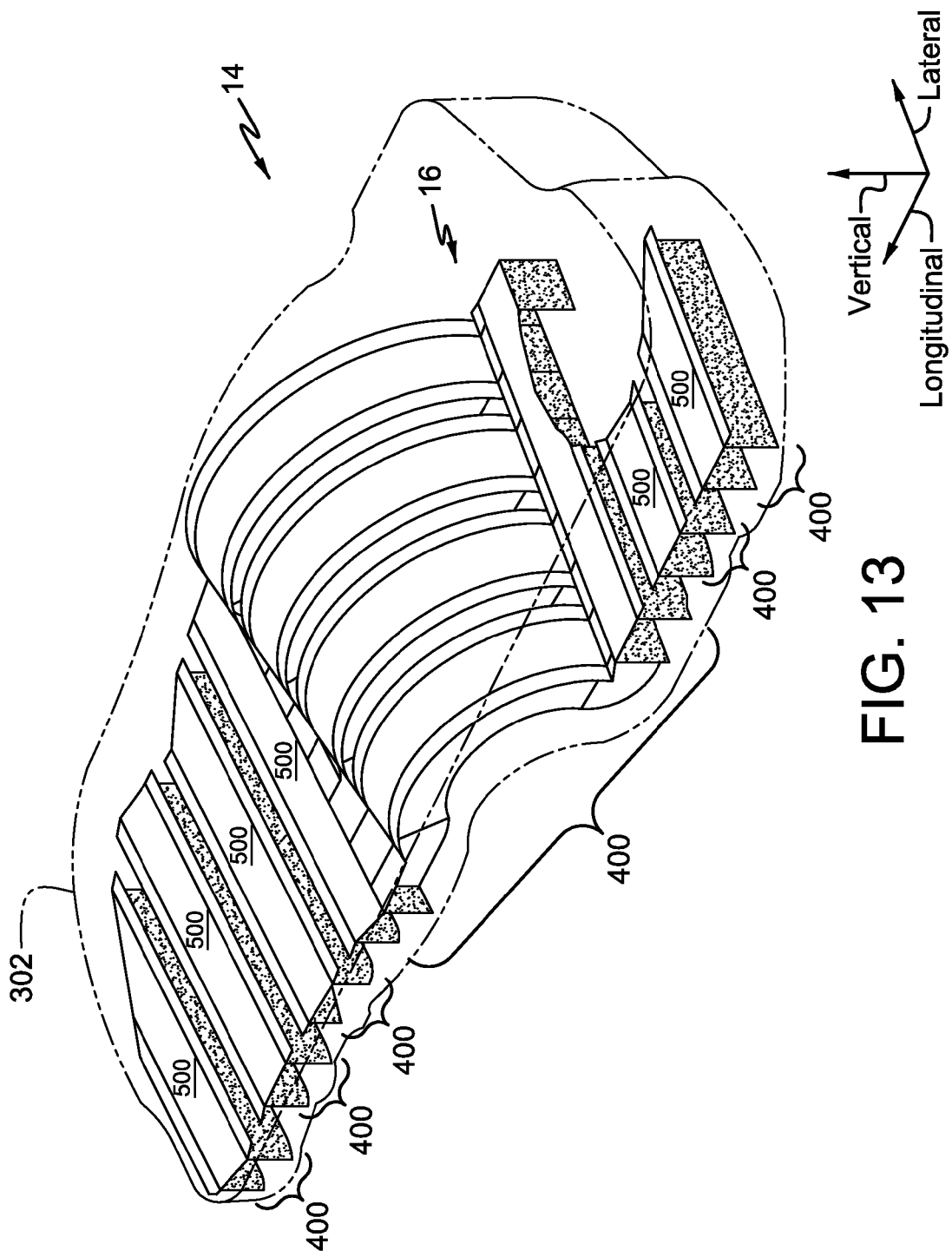

FIG. 13 shows another example of the fuel tank 14 including the housing 302 and a compliance structure assembly 16. Again the compliance structure assembly 16 includes a plurality of compliance structures 400 spaced away from one another and at least partially enclosed by the housing 302. Positioning the compliance structures in this way enables fuel to flow between various regions of the fuel tank. Additionally, the compliance structures 400 include base elements 500.

Figure 14:
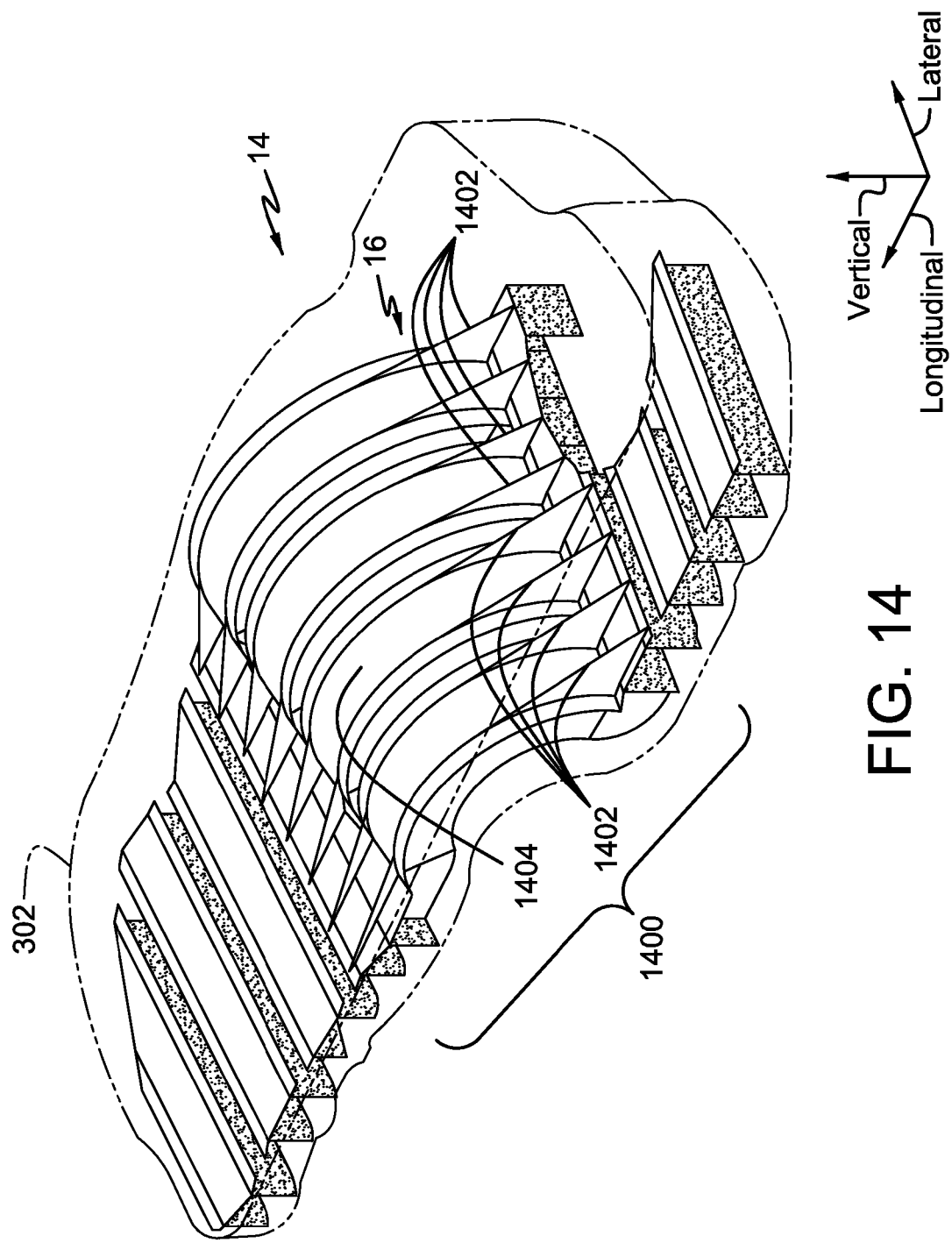

FIG. 14 shows another example of the fuel tank 14 including the housing 302 and the compliance structure assembly 16. As shown, a compliance structure 1400 includes structural elements 1402 extending in a vertical direction from a base element 1404.

Figure 15:
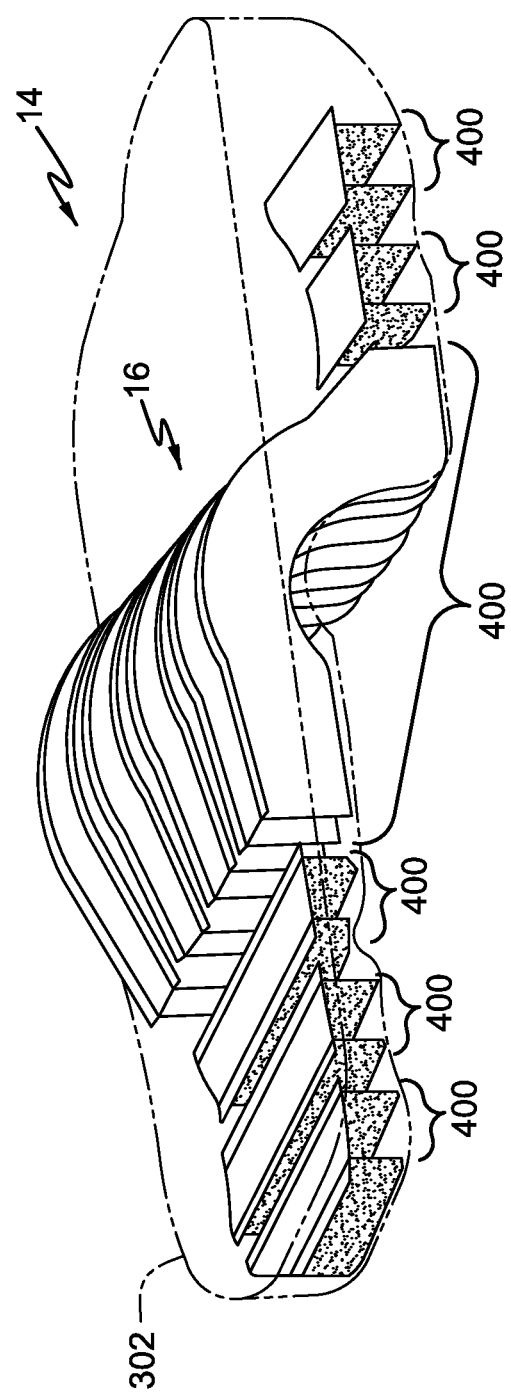

FIG. 15 shows another example of the fuel tank 14 including the housing 302 and the compliance structure assembly 16 having the plurality of compliance structures 400. As shown, one of the compliance structures 400 is positioned inside and outside of the housing 302. Thus, one of the compliance structures extends through the housing 302.

Figure 16:
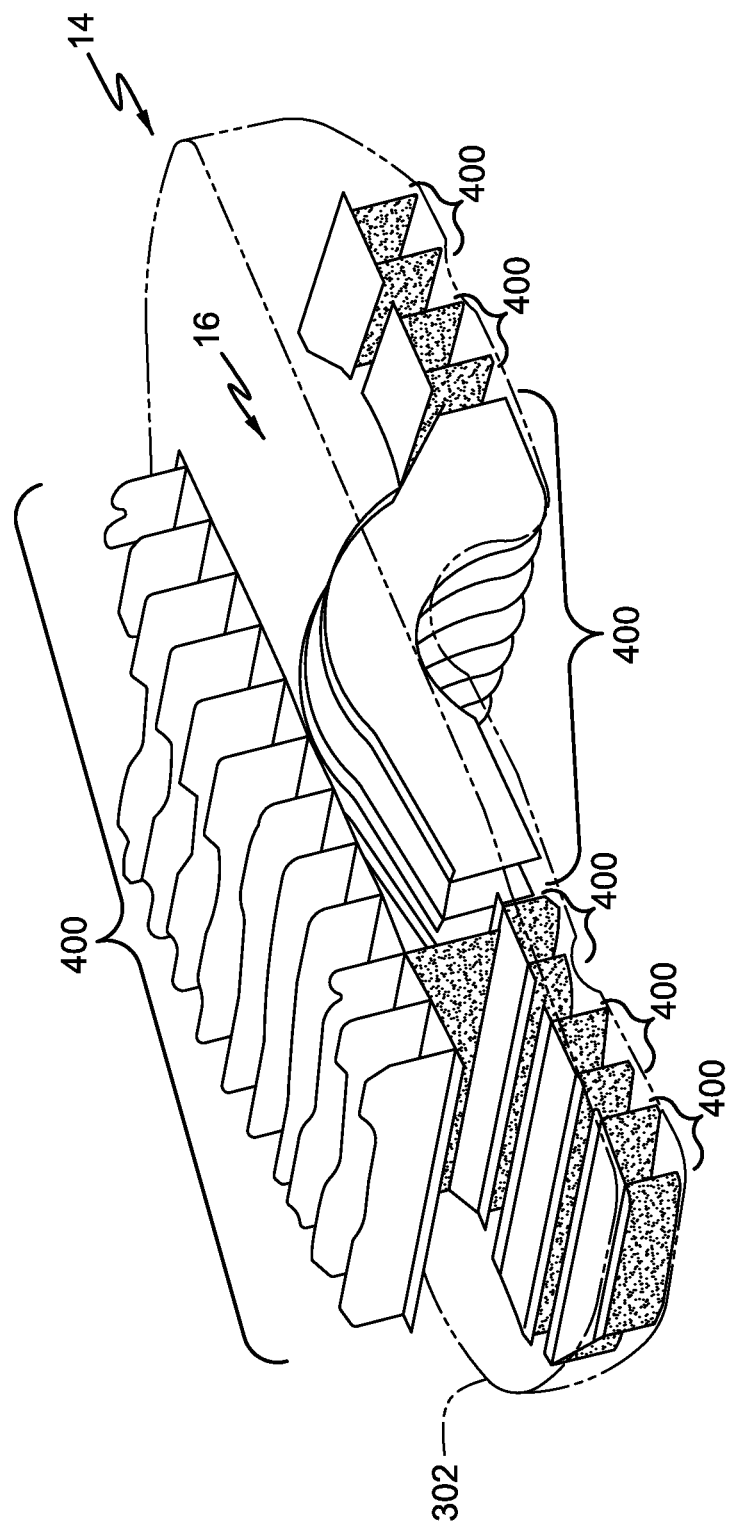

FIG. 16 shows another example of the fuel tank 14 including the housing 302 and the compliance structure assembly 16 having the plurality of compliance structures 400. As shown, one of the compliance structures 400 is positioned outside of the housing 302.

Figure 17:
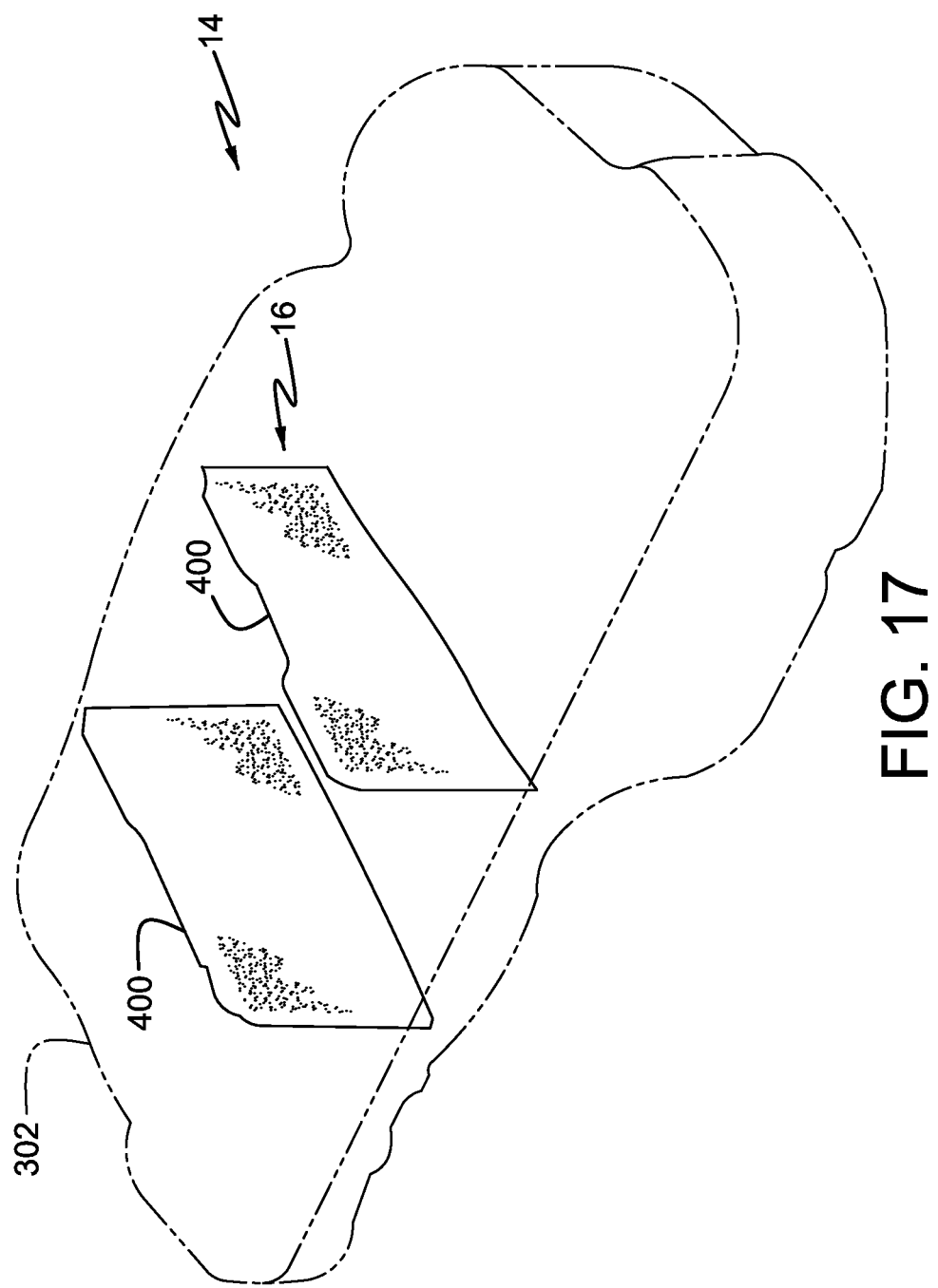

FIG. 17 shows another example the fuel tank 14 including the housing 302 and the compliance structure assembly 16 having the plurality of compliance structures 400. Again the compliance structures 400 are contoured to conform to the shape of the housing 302, thereby increasing the structural integrity of the fuel tank.

FIGS. 1-17 provide for a distensible fuel tank included in a vehicle, comprising a housing and a compliance structure coupled to the housing, the compliance structure including a base element coupled to a side of a structural element.

FIGS. 1-17 further provide for a distensible fuel tank where the compliance structure further includes a second structural element coupled to the base element. FIGS. 1-17 further provide for a distensible fuel tank where a side the second structural element is coupled to the side of the first structural element, the first and second structural elements forming an angle.

FIGS. 1-17 further provide for a distensible fuel tank where the angle is less than 60 degrees. FIGS. 1-17 further provide for a distensible fuel tank where a height of the side of the first structural element along its length varies from a height of a side of the second structural element along its length. FIGS. 1-17 further provide for a distensible fuel tank where a thickness of the base element is not equal to a thickness of the structural element.

FIGS. 1-17 further provide for a distensible fuel tank where a height of the structural element varies along its length. FIGS. 1-17 further provide for a distensible fuel tank where a second side of the structural element is coupled to a surface of the housing. FIGS. 1-17 further provide for a distensible fuel tank where the surface is an internal surface.

FIGS. 1-17 further provide for a distensible fuel tank where the compliance structure laterally spans an internal volume of the distensible fuel tank. FIGS. 1-17 further provide for a distensible fuel tank where the surface is an external surface. FIGS. 1-17 further provide for a distensible fuel tank where a bottom surface of the base element is spaced away from a surface of the housing. FIGS. 1-17 further provide for a distensible fuel tank where the bottom surface is planar. FIGS. 1-17 further provide for a distensible fuel tank where the compliance structure forms a single continuous piece of material.

FIGS. 1-17 provide for a distensible fuel tank included in a vehicle, comprising a housing including a surface and a compliance structure coupled to the housing, the compliance structure including a base element coupled to a first side of a structural element, a second side of the structural element coupled to the surface.

FIGS. 1-17 further provide for a distensible fuel tank wherein the compliance structure further includes a second structural element, a third structural element, and a fourth structural element, the first and second structural element coupled to form an angle different than an angle formed between the third and fourth structural elements. FIGS. 1-17 further provide for a distensible fuel tank wherein the vehicle includes an electric motor configured to provide motive power. FIGS. 1-17 further provide for a distensible fuel tank where the compliance structure is flexible.

FIGS. 1-17 provide for a distensible fuel tank in a vehicle, comprising a housing including a surface and a compliance structure coupled to the housing, the compliance structure including a base element coupled to a first side of a structural element, a second side of the structural element coupled to the surface, a thickness of the base element is not equal to a thickness of the structural element. FIGS. 1-17 further provide for a distensible fuel tank where the base element is perpendicular to the structural element.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A distensible fuel tank included in a vehicle, comprising:
a housing having an inner surface; and
a plurality of compliance structures coupled to and fully enclosed by the housing, each compliance structure including one or more structural elements each having a first side coupled to a base element and a second side coupled to the inner surface of the housing, wherein the base elements of the plurality of compliance structures include one or more curved base elements and one or more substantially planar base elements, the base elements coupled to the inner surface of the housing.

2. The distensible fuel tank of claim 1, wherein the base element of each compliance structure is coupled to both the first side of a first structural element of the compliance structure and the first side of a second structural element of the compliance structure.

3. The distensible fuel tank of claim 2, where for each base element, the first side of the second structural element which is coupled to the base element is further coupled to the first side of the first structural element which is coupled to the base element, the first and second structural elements forming an angle, each of the two structural elements and the base element of each compliance structure aligned laterally in the fuel tank.

4. The distensible fuel tank of claim 3, where the angle is less than 60 degrees.

5. The distensible fuel tank of claim 2, wherein for each compliance structure, a height of the first structural element along its length varies from a height of the second structural element along its length.

6. The distensible fuel tank of claim 1, wherein for each compliance structure, a thickness of the base element is not equal to a thickness of each of the structural elements.

7. The distensible fuel tank of claim 1, where a height of each of the structural elements varies along its length.

8. The distensible fuel tank of claim 1, where the plurality of compliance structures laterally spans an internal volume of the distensible fuel tank.

9. The distensible fuel tank of claim 1, where each compliance structure forms a single continuous piece of material.

10. The distensible fuel tank of claim 1, wherein the curved base elements extend in a longitudinal direction of the fuel tank, and wherein the substantially planar base elements extend in a lateral direction of the fuel tank.

11. The distensible fuel tank of claim 1, wherein the plurality of compliance structures includes at least four compliance structures with curved base elements and at least four compliance structures with substantially planar base elements.

12. A distensible fuel tank included in a vehicle, comprising:
a housing including an inner surface; and
a compliance structure coupled to and enclosed by the housing, the compliance structure including a convex base element coupled to a first side of a structural element, a second side of the structural element coupled to the inner surface, and the base element further coupled to the inner surface.

13. The distensible fuel tank of claim 12, wherein the structural element is a first structural element, and wherein the compliance structure further includes a second structural element, a third structural element, and a fourth structural element, the base element coupled to a first side of each of the second, third, and fourth structural elements, and the first and second structural elements coupled to form an angle different than an angle formed between the third and fourth structural elements.

14. The distensible fuel tank of claim 12, wherein the vehicle includes an electric motor configured to provide motive power.

15. The distensible fuel tank of claim 12, where the compliance structure is flexible.

16. The distensible fuel tank of claim 12, wherein the compliance structure comprises a single base element and a plurality of structural elements.

17. The distensible fuel tank of claim 16, wherein the single base element is positioned perpendicular to the plurality of structural elements.

18. A distensible fuel tank in a vehicle, comprising:
a housing including an inner surface; and
a compliance structure assembly coupled to and enclosed by the housing, the compliance structure assembly including a plurality of separate but parallel planar base elements and a plurality of curved base elements, each base element coupled to a first side of a plurality of at least two respective planar structural elements, a second side of each base element coupled to the inner surface of the housing, and a second side of each of the plurality of structural elements coupled to the inner surface of the housing, a thickness of each base element not equal to a thickness of each structural element.

19. The distensible fuel tank of claim 18, where each base element is perpendicular to each of the structural elements coupled thereto.

20. The distensible fuel tank of claim 19, wherein the curved base elements and the structural elements coupled thereto extend in a longitudinal direction of the fuel tank, and wherein the planar base elements and the structural elements coupled thereto extend in a lateral direction of the fuel tank.

* * * * *